(12) United States Patent  
Nishimura

(10) Patent No.: US 11,046,024 B2  
(45) Date of Patent: Jun. 29, 2021

(54) APPARATUS FOR MANUFACTURING FIBER-REINFORCED MATERIAL PIECE

(71) Applicant: TSUDAKOMA KOGYO KABUSHIKI KAISHA, Ishikawa-ken (JP)

(72) Inventor: Isao Nishimura, Ishikawa-ken (JP)

(73) Assignee: TSUDAKOMA KOGYO KABUSHIKI KAISHA, Ishikawa-Ken (JP)

( * ) Notice: Subject to any disclaimer, the term of this patent is extended or adjusted under 35 U.S.C. 154(b) by 202 days.

(21) Appl. No.: 16/393,084

(22) Filed: Apr. 24, 2019

(65) Prior Publication Data

US 2019/0351628 A1    Nov. 21, 2019

(30) Foreign Application Priority Data

May 17, 2018    (JP) .............................. JP2018-095073

(51) Int. Cl.
*B29C 70/30*    (2006.01)
*B29C 70/54*    (2006.01)

(52) U.S. Cl.
CPC ............ *B29C 70/30* (2013.01); *B29C 70/545* (2013.01)

(58) Field of Classification Search
CPC .............................. B29C 70/382; B29C 70/386
See application file for complete search history.

(56) References Cited

U.S. PATENT DOCUMENTS

| | | | | |
|---|---|---|---|---|
| 4,208,238 A | * | 6/1980 | August .............. | B23K 26/0846 156/510 |
| 2004/0026025 A1 | * | 2/2004 | Sana ..................... | B29C 70/386 156/256 |
| 2007/0251641 A1 | | 11/2007 | Santos Gomez et al. | |
| 2014/0342028 A1 | | 11/2014 | Kwon et al. | |

(Continued)

FOREIGN PATENT DOCUMENTS

| | | |
|---|---|---|
| EP | 2228200 A1 | 9/2010 |
| JP | H07-110499 B2 | 11/1995 |

OTHER PUBLICATIONS

Jeffries, Kyle A, "Enhanced Robotic Automated Fiber Placement with Accurate Robot Technology and Modular Fiber Placement Head", SAE Int J Aerosp. 6(2), Sep. 2013.*

(Continued)

*Primary Examiner* — Jeffry H Aftergut

(74) *Attorney, Agent, or Firm* — Paratus Law Group, PLLC

(57) ABSTRACT

A manufacturing apparatus includes a support structure which supports a lay-up head and a trimming head, a guide member which is provided corresponding to the support structure and supports the support structure so that the support structure is movable along a lay-up base, and a driving mechanism which moves the support structure on the guide member, in which in the lay-up process, the support structure allows the trimming head supported on the support structure to be placed in a trimming head retracted position which does not interfere with the lay-up head, in the trimming process, the support structure allows the lay-up head supported on the support structure to be placed in a lay-up head retracted position which does not interfere with the trimming head.

2 Claims, 5 Drawing Sheets

(56) References Cited

U.S. PATENT DOCUMENTS

2014/0361460 A1 12/2014 Mark

OTHER PUBLICATIONS

Wells, Dan, et al , "Integrating Ultrasonic Cutting With High-Accuracy Robotic Automatic Fiber Placement for Production Flexibility", Sampe Tech, Seattle WA, Jun. 2014.*
Oct. 9, 2019, European Search Report issued for related EP Application No. 19171612.5.

* cited by examiner

APPARATUS FOR MANUFACTURING FIBER-REINFORCED MATERIAL PIECE

CROSS-REFERENCE TO RELATED APPLICATIONS

The present application claims priority from Japanese Patent Application No. 2018-095073, filed May 17, 2018, the entire content of which is incorporated herein by reference.

BACKGROUND OF THE INVENTION

Field of the Invention

The present invention relates to an apparatus for manufacturing a fiber-reinforced material piece from a fiber-reinforced material formed by laying up reinforcing fiber base materials. The apparatus includes a lay-up base on which lay-up of reinforcing fiber base materials is performed, a lay-up mechanism which has a lay-up head and moves the lay-up head onto a fixed lay-up area on the lay-up base to lay up the reinforcing fiber base materials on the lay-up area, and a trimming mechanism which has a trimming head and moves the trimming head on the lay-up area to perform trimming on the fiber-reinforced material formed by the lay-up mechanism. The apparatus is used to manufacture a fiber-reinforced material piece through a lay-up process for laying up the reinforcing fiber base materials by the lay-up mechanism to form the fiber-reinforced material and a trimming process for cutting the fiber-reinforced material into a predetermined shape by the trimming mechanism.

Description of the Related Art

In recent years, aircraft-related parts, automobile-related parts, sports and leisure articles, and the like have been formed of fiber-reinforced composite materials. The fiber-reinforced composite material is manufactured by pressurizing and heating a fiber-reinforced material formed by laying up reinforcing fiber base materials (for example, base materials formed by combining reinforcing fibers (carbon fibers, glass fibers, aramid fibers, or the like) with a resin material or the like) to form the fiber-reinforced material.

As one type of the reinforcing fiber base materials, there is a so-called prepreg. As the prepreg, there is a fabric material obtained by impregnating a fabric formed using reinforcing fibers as warps and wefts with matrix resin, or a so-called UD material obtained by impregnating reinforcing fibers in a state of being aligned in one direction with matrix resin and bundling the reinforcing fibers. In addition to such a prepreg, the reinforcing fiber base materials also include a so-called semi-preg which contains matrix resin, a bonding material (binder), or the like added for bonding to such an extent that the reinforcing fibers maintain bundling properties.

The fiber-reinforced material is formed by, for example, a lay-up process of disposing a reinforcing fiber base material in a lay-up area on a lay-up base such as a table and laying up a reinforcing fiber base material on the disposed reinforcing fiber base material. In manufacturing the fiber-reinforced composite material, there is a case where a trimming process of cutting (trimming) the fiber-reinforced material formed as described above according to a shape or the like of the fiber-reinforced composite material to be formed is performed in a previous step of the forming by the pressurizing and heating described above. The trimming process is performed in a manner of using a cutter having a trimming head and moving the trimming head on the fiber-reinforced material. By the trimming process (cutting), a fiber-reinforced material piece cut out from the fiber-reinforced material is formed.

In the related art, the lay-up process and the trimming process are generally performed at different places in a factory. Therefore, in this case, in each process for forming the fiber-reinforced material piece, in transitioning the process from the lay-up process to the trimming process, a conveying process of conveying the fiber-reinforced material formed in the lay-up process to a place where the trimming is performed is performed between the lay-up process and the trimming process.

However, since the conveying process involves laborious work for a worker, the work of forming the fiber-reinforced material piece in the past is very poor in work efficiency. Thus, JP-B-H07-110499 discloses a fiber-reinforced material piece (a prepreg lay-up material)-manufacturing apparatus which does not require such a conveying process so that working efficiency can be improved by omitting the conveying process.

The apparatus disclosed in JP-B-H07-110499 (hereinafter referred to as an "apparatus of the related art") is configured such that the lay-up process and the trimming process are performed on the same working table. Specifically, the apparatus in the related art has a detachable head movable on the working table and has a lay-up attachment and a trimming attachment which are detachably mounted to the detachable head. In the apparatus in the related art, the lay-up attachment is mounted to the detachable head when the lay-up process is performed, and the trimming attachment is mounted to the detachable head when the trimming process is performed. That is, the apparatus in the related art allows the attachment to be replaced using the detachable head so that the lay-up process and the trimming process can be performed on the same working table.

However, the apparatus in the related art requires an operation for replacing the attachment, which is to be mounted to the detachable head, every time when the above process proceeds from the lay-up process to the trimming process. For this reason, the apparatus in the related art requires time for the replacement of the attachment, and accordingly, the process of forming the fiber-reinforced material piece is still poor in efficiency.

SUMMARY OF THE INVENTION

It is, therefore, an object of the present invention to provide an apparatus capable of efficiently performing the process of manufacturing a fiber-reinforced material piece through the process of laying up a reinforcing fiber base material using a lay-up mechanism to form a fiber-reinforced material and the process of trimming the fiber-reinforced material into a predetermined shape using a trimming mechanism.

In order to achieve the object, the present invention is directed to an apparatus for manufacturing a fiber-reinforced material piece, including: a support structure which supports a lay-up head and a trimming head; a guide member which is provided corresponding to the support structure and supports the support structure so that the support structure is movable along a lay-up base; a driving mechanism which moves the support structure on the guide member, in which in a lay-up process, the support structure allows the trimming head supported on the support structure to be placed in a trimming head retracted position which does not interfere with the lay-up head, and in a trimming process, the support structure allows the lay-up head supported on the support structure to be placed in a lay-up head retracted position which does not interfere with the trimming head.

In the apparatus for manufacturing a fiber-reinforced material piece according to the present invention, the support structure may include a first support part supporting the lay-up head, and a second support part supporting the trimming head.

The support structure may include a first structural body including the first support part, and a second structural body including the second support part. The driving mechanism may include a first driving unit which is provided corresponding to the first structural body and moves the first structural body on the guide member, and a second driving unit which is provided corresponding to the second structural body and moves the second structural body on the guide member. Each of the retracted positions may be an out-of-area retracted position which does not overlap the lay-up area in the longitudinal direction of the guide member, in which the guide member may extend to the out-of-area retracted position.

When the apparatus for manufacturing a fiber-reinforced material piece according to the present invention is used, the trimming head being supported on the support structure can be placed in the trimming head-retracted position in the lay-up process, and the lay-up head being supported on the support structure can be placed in the lay-up head-retracted position in the trimming process. Therefore, each of the lay-up process and the trimming process can be performed without removing the trimming head or the lay-up head from the support structure. Therefore, according to the present invention, there is no need to replace the head (attachment), in contrast to the apparatus in the related art, when the process proceeds from the lay-up process to the trimming process or the lay-up process is performed again. This makes it possible to efficiently perform the process of manufacturing a fiber-reinforced material piece.

In the apparatus for manufacturing a fiber-reinforced material piece according to the present invention, the support structure may include first and second support parts. In this case, only the head for each of the processes can be moved on the lay-up area. This makes it possible to further efficiently perform the process of manufacturing a fiber-reinforced material piece.

In addition, the support structure may include two structural bodies: a first structural body including the first support part and a second structural body including the second support part, and the driving mechanism may include a first driving unit for the first structural body and a second driving unit for the second structural body. In this case, a drive source, such as a motor, used for moving each head can be reduced in size. This makes it possible to keep low the cost of the apparatus for manufacturing a fiber-reinforced material piece.

Specifically, if the support structure supporting the lay-up head and the trimming head is a single structural body, the support structure needs to have a strength enough to support both the heads, and therefore, the support structure has to be configured such that such a strength is sufficiently secured. As a result of such a configuration, the support structure becomes heavy, which inevitably requires use of a high-power motor as the drive source in the driving mechanism for moving the support structure. Thus, such a configuration increases the cost of the apparatus for manufacturing a fiber-reinforced material piece.

In contrast, when the support structure includes two structural bodies (the first structural body and the second structural body) supporting the corresponding heads, as described above, the strength required of each structural body may be lower than that of the structure described above. When the support structure includes two structural bodies, the driving mechanism may include two driving units (the first and second driving units) provided corresponding to the respective structural bodies. In addition, when each structural body includes a low-strength structural body as described above, each structural body can be lightweight, and therefore, a low-power motor can be used as the drive source in each driving unit. In addition, the strength or size of each structural body can be determined according to the size (weight) of the head corresponding to each structural body. Therefore, when one of the two heads (particularly the lay-up head) is large, the structural body supporting the other head can be reduced in size without being matched with the one head. Therefore, the cost of the apparatus for manufacturing a fiber-reinforced material piece can be kept lower.

When the support structure includes two structural bodies as described above, each of the retracted positions for the lay-up head and the trimming head may be the out-of-area retracted position described above, and the guide member may extend to the out-of-area retracted position. In this case, the movement of each head to the retracted position can be achieved by moving the corresponding structural body to the out-of-area retracted position. This eliminates the need for a high-strength support structure in contrast to the case where the retracted position is set within the range of the support part in the support structure. As a result, the cost of the apparatus for manufacturing a fiber-reinforced material piece can be kept low:

Specifically, in the apparatus for manufacturing a fiber-reinforced material piece according to the present invention, the support structure may be formed such that the support part extends in a direction (hereinafter referred to as a "width direction") orthogonal to the longitudinal direction of the guide member in the horizontal direction. In this case, the retracted position may also be set within the range of the support part. However, in this case, the support part in the support structure should extend over a length within which the retracted position lies in the width direction, so that the support part becomes longer, which will require an increase in the strength of the support part itself or the strength of a portion or the like supporting the support part. Therefore, in this case, the cost of the apparatus for manufacturing a fiber-reinforced material piece is increased. In contrast, when the above configuration is provided according to the present invention, the support part itself does not need to have a long structure including the retracted position as described above. Therefore, in this case, the support structure does not need to have a high strength, which can keep low the cost of the apparatus for manufacturing a fiber-reinforced material piece.

DESCRIPTION OF THE PREFERRED EMBODIMENTS

Figure 1:
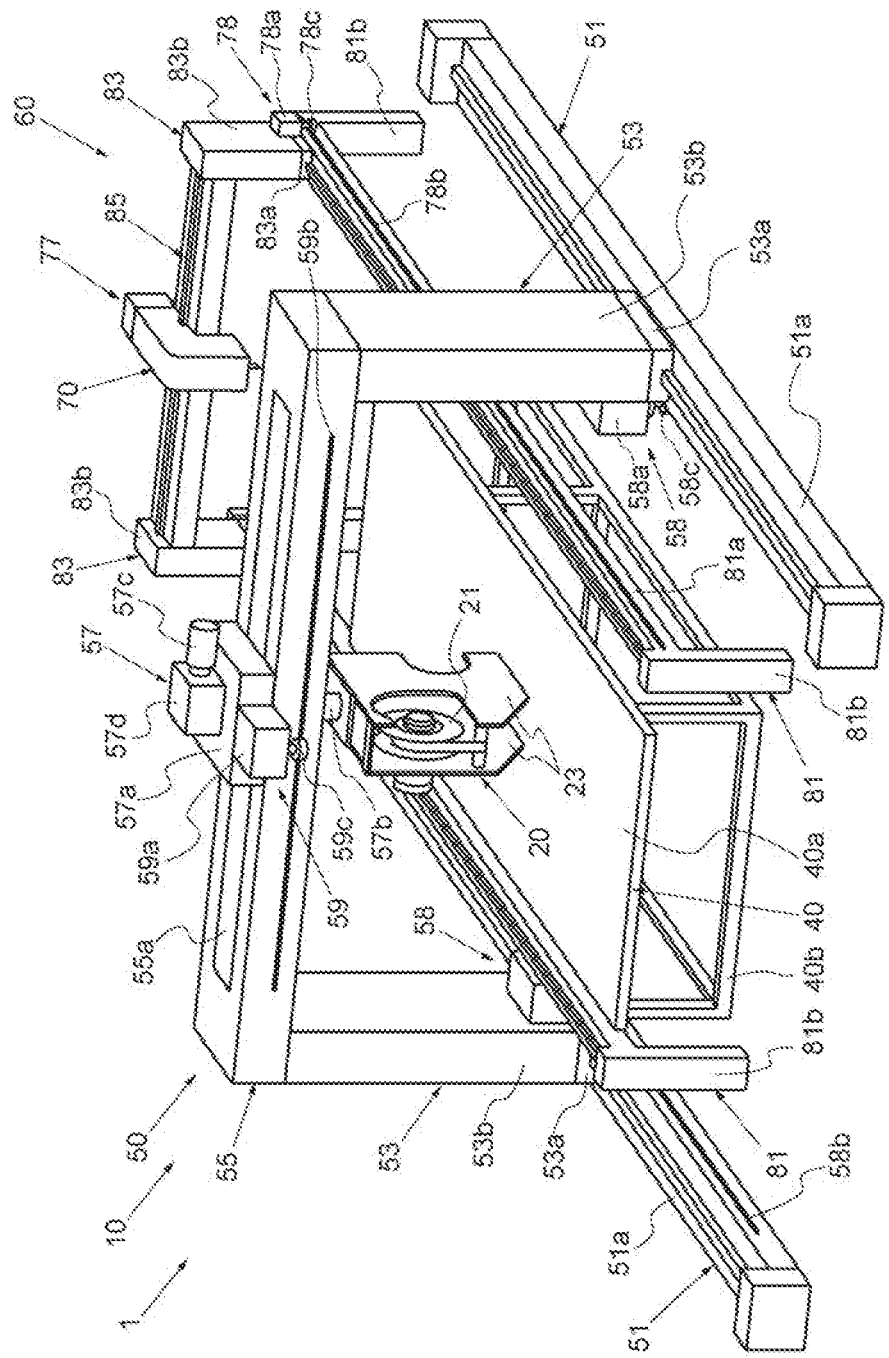
FIG. 1 is an overall configuration diagram of an apparatus according to the present invention for manufacturing a fiber-reinforced material piece.
Figure 2:
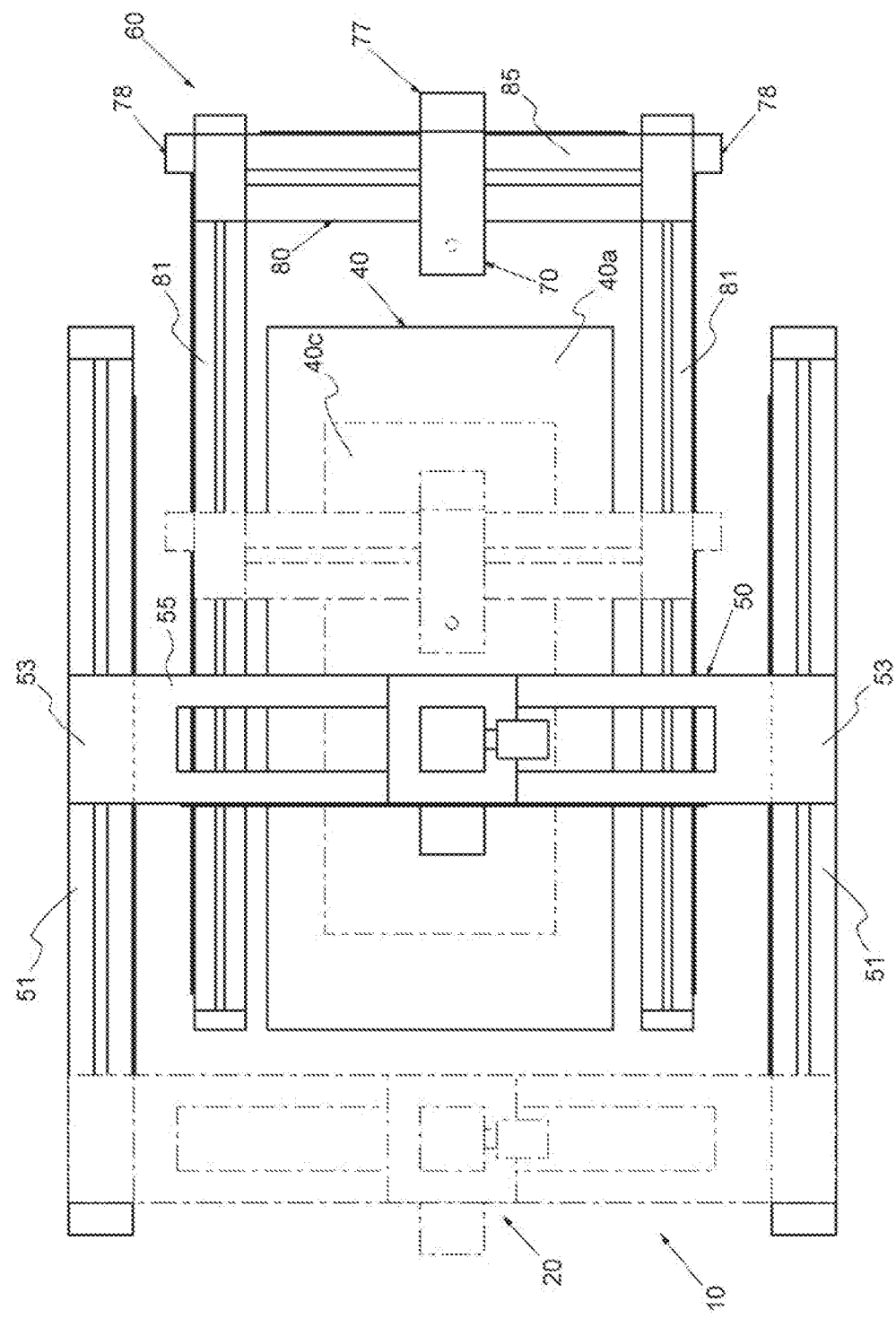
FIG. 2 is an overall plan view of the manufacturing apparatus shown in FIG. 1.

Hereinafter, an embodiment (example) of an apparatus for manufacturing a fiber-reinforced material piece, to which the present invention is applied, will be described based on FIGS. 1 to 4. The fiber-reinforced material piece which is referred to in the present invention is a fiber-reinforced material piece cut out from a fiber-reinforced material formed by laying up a reinforcing fiber base material on a lay-up base, as described above. However, in this example, the reinforcing fiber base material which serves as a base of the fiber-reinforced material (piece) shall be a thermosetting prepreg obtained by impregnating carbon fibers as reinforcing fibers with thermosetting resin (epoxy resin or the like) as matrix resin.

As shown in FIGS. 1 to 4, a manufacturing apparatus 1 is provided with a table 40 as a lay-up base on which a prepreg P is laid up, and a lay-up mechanism 10 for laying up the prepreg P on the table 40. The manufacturing apparatus 1 is also provided with a trimming mechanism 60 for performing trimming on a prepreg lay-up material PS as a fiber-reinforced material made of the laid-up prepreg P, in order to cut out a prepreg lay-up material piece as a fiber-reinforced material piece from the prepreg lay-up material PS.

With respect to each constituent element with which the manufacturing apparatus 1 is provided, the table 40 includes a top board 40a having a rectangular shape when viewed in a plan view, and a support base 40b which supports the top board 40a. The lay-up of the prepreg P described above is performed on the top board 40a of the table 40, while the lay-up is performed in a lay-up area 40c defined in the top board 40a.

The lay-up mechanism 10 includes a lay-up head 20 for laying up the prepreg P, a portal type support structural body (corresponding to a first structural body) 50 which supports the lay-up head 20 in a suspending manner, and a pair of side rails 51 and 51 which supports the support structural body 50.

With respect to them, each of the pair of side rails 51 and 51 is mainly composed of a long rectangular column-shaped base portion 51a. The pair of side rails 51 and 51 is installed on a floor on both sides in a short-side direction of the top board 40a, with respect to the table 40, in such a direction that a longitudinal direction thereof is parallel to a longitudinal direction of the top board 40a of the table 40. In the following, the longitudinal direction of the top board 40a of the table 40 and the direction parallel thereto will be referred to as a "front-rear direction".

The support structural body 50 is provided with a pair of columns 53 and 53 provided corresponding to the respective side rails 51, a crossbeam 55 (corresponding to a first support part) installed between both the columns 53 and 53, and a saddle unit 57 which is provided on the crossbeam 55 and supports the lay-up head 20. Each column 53 is composed of a pedestal part 53a and a support post 53b provided to be erected on the pedestal part 53a. Each column 53 is provided in a state of being placed on the base portion 51a of the corresponding side rail 51 at the pedestal part 53a.

The crossbeam 55 is a long rectangular column-shaped beam member and is installed between the pair of columns 53 and 53 in such a manner that each of both end portions thereof is mounted on the upper end of each of the support posts 53b of both the columns 53 and 53. In a state where the crossbeam 55 is installed in this manner, both the columns 53 and 53 are in a state where the positions in the front-rear direction coincide with each other, and in this way, the crossbeam 55 is in a state where the longitudinal direction thereof coincides with a direction (the short-side direction of the top board 40a of the table 40) orthogonal to the front-rear direction. In the following, the short-side direction of the top board 40a of the table 40 and the direction parallel thereto will be described to be referred to as a "width direction".

The saddle unit 57 is a mechanism for making the lay-up head 20 be in a state of being supported by the support structural body 50 and is provided on the crossbeam 55. The saddle unit 57 is mainly composed of a plate-shaped saddle base 57a which is placed on the crossbeam 55. The saddle unit 57 has a support shaft 57b supported to be rotatable with respect to the saddle base 57a in such a manner as to protrude downward from the surface of the saddle base 57a on the crossbeam 55 side. For this reason, in order to allow the disposition of the support shaft 57b, a hole 55a penetrating the crossbeam 55 in a vertical direction and extending in the width direction is formed in the crossbeam 55. The support shaft 57b of the saddle unit 57 is inserted into the hole 55a and extends to below the crossbeam 55.

The saddle unit 57 has a head rotating part provided on the saddle base 57a. The head rotating part is a part for rotating the support shaft 57b and is provided with a driving motor 57c and a driving-force transmission mechanism 57d which connects the driving motor 57c and the support shaft 57b and transmits the rotation of an output shaft of the driving motor 57c to the support shaft 57b. In this way, the saddle unit 57 has a configuration in which the support shaft 57b is rotated by the head rotating part with its own axial center extending in the vertical direction as a rotation center.

In the lay-up mechanism 10, a head moving unit 59 for moving the saddle unit 57 in the width direction is provided between the saddle unit 57 and the crossbeam 55. The head moving unit 59 is composed of a driving motor 59a mounted on the side surface of the saddle base 57a of the saddle unit 57 with the axis of an output shaft directed in the vertical direction, a rack 59b mounted on the side surface of the crossbeam 55, and a pinion gear 59c which is mounted to the output shaft of the driving motor 59a and meshes with the rack 59b. As described above, the hole 55a extending in the width direction is formed in the crossbeam 55. Therefore, the lay-up mechanism 10 has a configuration in which the saddle unit 57 is driven to move in the width direction by the head moving unit 59 on the crossbeam 55.

In the lay-up mechanism 10, a head moving unit (corresponding to a first driving unit) 58 for moving the lay-up head 20 in the front-rear direction is provided between the base portion 51a of each side rail 51 and the column 53 which is placed on the base portion 51a. Each head moving unit 58 is composed of a driving motor 58a mounted to the column 53 with the axis of an output shaft thereof directed in the vertical direction, a rack 58b mounted to the side surface of the base portion 51a of the side rail 51 to extend in the front-rear direction, and a pinion gear 58c which is mounted to the output shaft of the driving motor 58a and meshes with the rack 58b. In this way, the lay-up mechanism 10 has a configuration in which both the columns 53 and 53 are driven to move in the front-rear direction on the side rails 51 (the base portions 51a). The support structural body 50 as a whole moves in the front-rear direction as both the columns 53 and 53 are moved in this manner.

In the lay-up mechanism 10, the lay-up head 20 is mounted to the saddle unit 57 provided on the crossbeam 55 of the support structural body 50. Specifically, the lay-up head 20 is mounted to the support shaft 57b of the saddle unit 57, thereby being provided in a state of being suspended from the crossbeam 55 of the support structural body 50. Therefore, the lay-up mechanism 10 is configured such that the lay-up head 20 moves in the front-rear direction as the support structural body 50 is moved in the front-rear direction by the head moving units 58, as described above.

The lay-up head 20 is mainly composed of a support frame which includes a pair of support plates 23 and 23, and supports a raw-cloth roll 21 configured by winding the prepreg P formed in a sheet form around a reel (a winding frame) between the support plates 23 and 23. The raw-cloth roll 21 is supported to be rotatable with respect to the support frame by fitting the reel in a relatively non-rotatable manner with respect to a support shaft 21a rotatably provided to be installed between the support plates 23 and 23.

Here, the prepreg P in this example is made using thermosetting resin as matrix resin, as described above, and has adhesiveness. For this reason, release paper RP is bonded to the surface on one side of the prepreg P such that winding layers of the prepreg P wound on the reel do not stick to each other. The prepreg P is wound on the reel with the surface on the release paper RP side inward in a radial direction.

In the lay-up mechanism 10, the prepreg P is drawn out from the raw-cloth roll 21 in the lay-up head 20 and prepreg pieces P' cut out from the prepreg P are sequentially laid up in the lay-up area 40c on the table 40. For this reason, in the lay-up head 20, each component for achieving the lay-up of the prepreg pieces P' on the lay-up area 40c is provided in the interior of the support frame (between the support plates 23 and 23).

Figure 3:
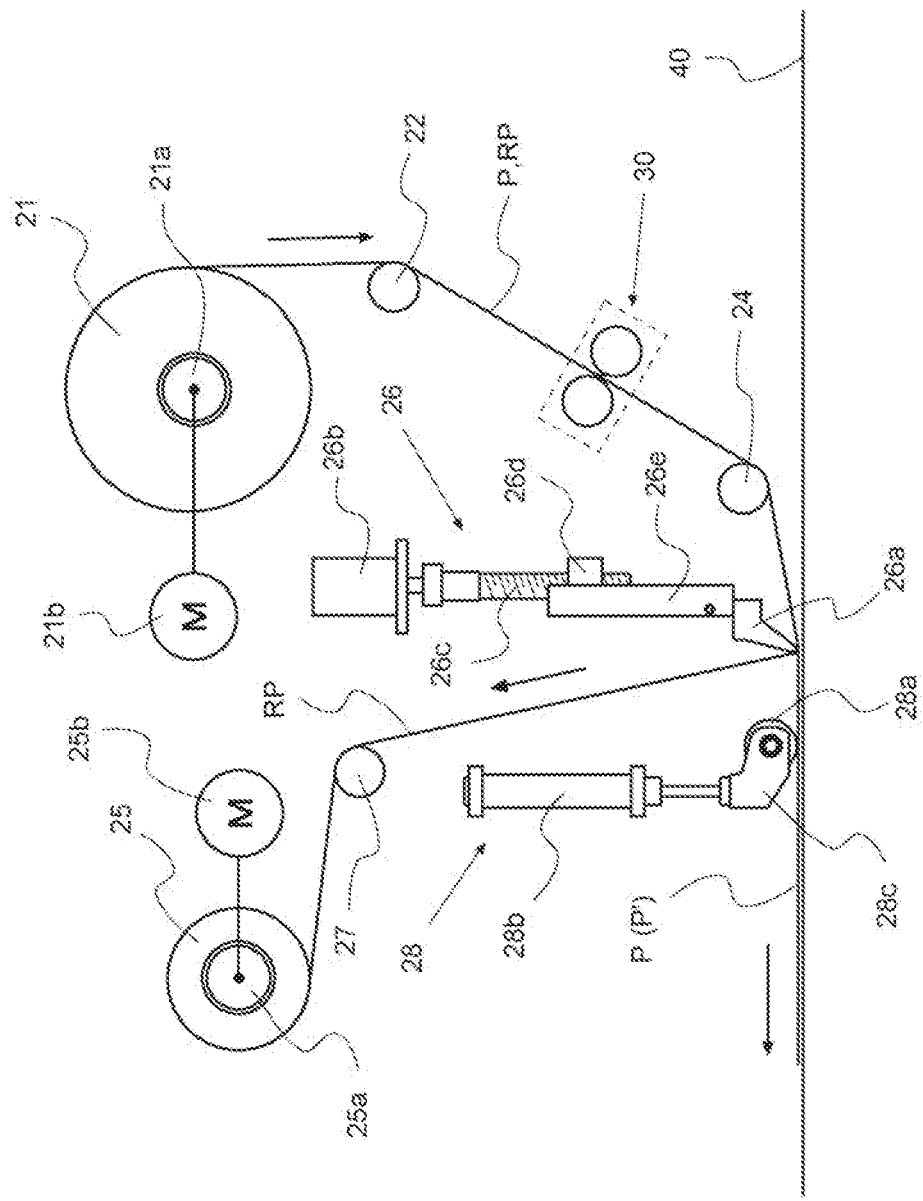
FIG. 3 is a side view schematically showing an internal configuration of a lay-up head in the manufacturing apparatus shown in FIG. 1.
Figure 4:
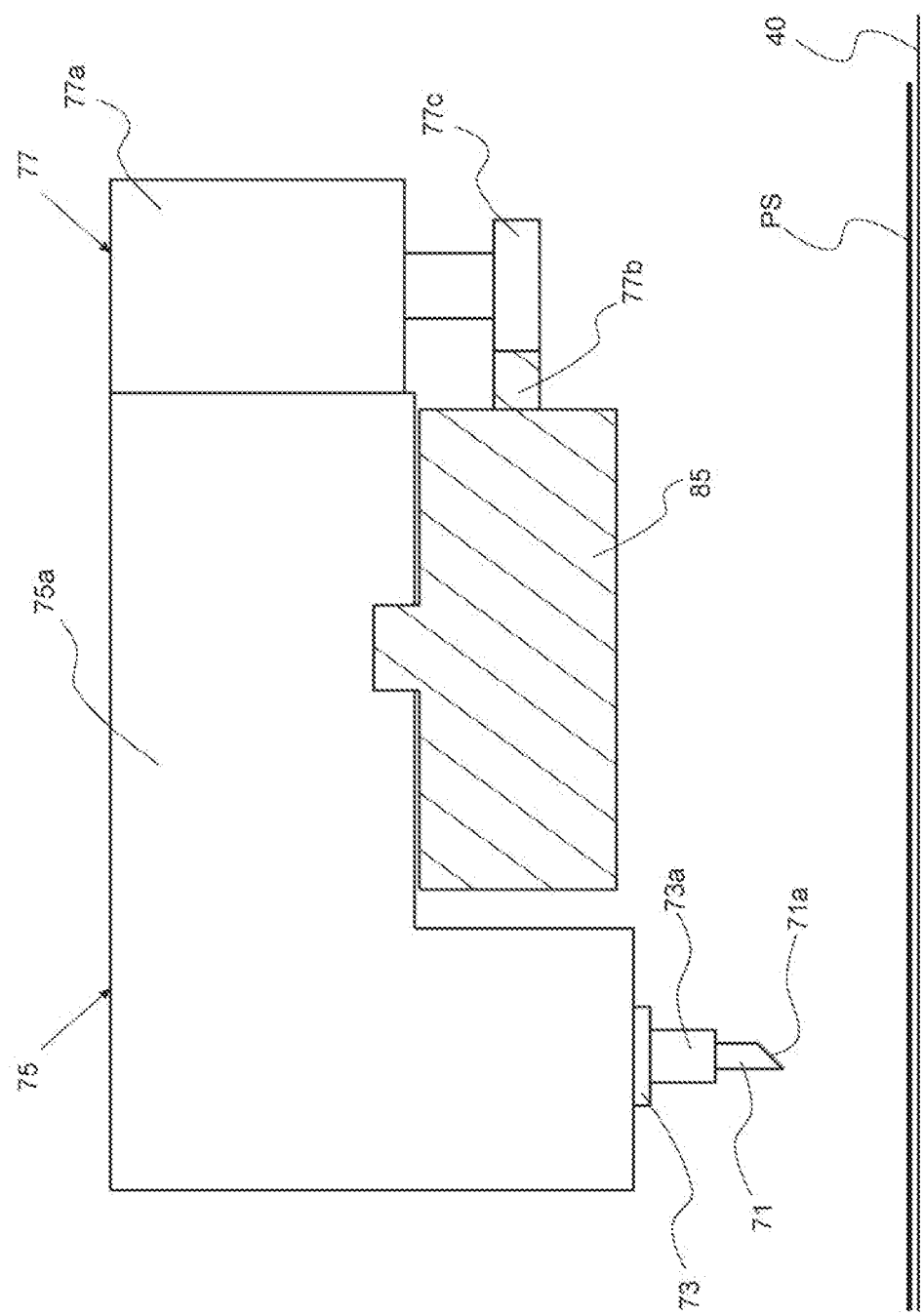
FIG. 4 is a side view schematically showing a trimming head in the manufacturing apparatus shown in FIG. 1.

FIG. 3 is a diagram schematically showing a configuration in the interior of the support frame in the lay-up head 20. As shown in FIG. 3, in the lay-up head 20, the prepreg P drawn out from the raw-cloth roll 21 is turned by being wound around a guide roller and is sent toward the lay-up unit side where the lay-up is performed.

The lay-up head 20 is provided with a cutter unit 30 for cutting out the prepreg piece P' from the prepreg P such that the prepreg P is laid up as the prepreg piece P' having a predetermined length. The cutter unit 30 is provided between a first guide roller 22 and a second guide roller 24 in the path of the prepreg P in the lay-up head 20. As described above, the release paper RP is bonded to one surface of the prepreg P. The cutter unit 30 is configured to cut only the prepreg P and not to cut the release paper RP.

The lay-up unit described above is provided with a laying mechanism 26 for laying the prepreg piece P' in the lay-up area 40c on the table 40, and a pressing mechanism 28 for pressing the laid prepreg pieces P' on the table 40. With respect to these configurations, the laying mechanism 26 is provided with a laying guide 26a for guiding the prepreg P on the table 40. The laying mechanism 26 is configured such that the laying guide 26a is supported by a ball screw mechanism and driven to be displaced in an up-down direction. More specifically, the laying mechanism 26 includes a ball screw mechanism composed of a driving motor 26b, a screw shaft 26c connected to an output shaft of the driving motor 26b and a nut 26d threadedly engaged with the screw shaft 26c, and has a configuration in which the laying guide 26a is supported on the nut 26d of the ball screw mechanism through a bracket 26e. The ball screw mechanism is provided in the support frame in such a direction that the screw shaft 26c extends downward in the vertical direction.

The laying mechanism 26 is provided with a guide (not shown) for preventing co-rotation of the nut 26d and the bracket 26e with respect to the rotation of the screw shaft 26c and guiding the movement in the up-down direction of the bracket 26e and the laying guide 26a. With this configuration, in the laying mechanism 26, the nut 26d and the bracket 26e are displaced upward or downward according to the rotational direction of the screw shaft 26c according to the rotational driving of the screw shaft 26c by the driving motor 26b, and accordingly, the laying guide 26a is displaced in the up-down direction. In the laying mechanism 26, the driving of the driving motor 26b is controlled such that the laying guide 26a is displaced between two positions regarding the positions in the up-down direction of the laying guide 26a, that is, an operation position which is a position at the time of laying the prepreg P and a position close to the lay-up area 40c on the top board 40a of the table 40, and a non-operation position which is a position spaced apart upward from the top board 40a of the table 40.

The pressing mechanism 28 is provided with a pressing roller 28a for pressing the prepreg P laid in the lay-up area 40c on the table 40. The pressing mechanism 28 has a configuration in which the pressing roller 28a is supported by a fluid pressure cylinder 28b such as an air cylinder. That is, the pressing mechanism 28 includes the pressing roller 28a and the fluid pressure cylinder 28b and has a configuration in which the pressing roller 28a is rotatably supported by a rod of the fluid pressure cylinder 28b through a bracket 28c. The fluid pressure cylinder 28b is provided in the support frame in such a direction that the rod extends downward in the vertical direction on the downstream side in a drawing-out direction of the prepreg P with respect to the laying mechanism 26. The laying mechanism 26 and the pressing mechanism 28 are provided to be disposed such that the centers of the laying guide 26a and the pressing roller 28a coincide with each other in the width direction of the lay-up head 20 (the width direction of the prepreg P).

With respect to the pressing mechanism 28, the fluid pressure cylinder 28b is, for example, a single-acting air cylinder and has built-in biasing means such as a spring for biasing the rod in a retreating direction (upward). In the pressing mechanism 28, compressed air is supplied to the fluid pressure cylinder 28b, whereby the rod of the fluid pressure cylinder 28b advances downward, and thus a state where the pressing roller 28a is pressed against the prepreg P laid in the lay-up area 40c is created. The lay-up head 20 moves in the laying-up direction, whereby the pressing roller 28a of the pressing mechanism 28 moves along the already laid prepreg P while rotating in a state of being pressed against the prepreg P. As a result, the laid prepreg P enters a state of being pressed on the table 40. During the movement of the lay-up head 20 except for the time of the lay-up of the prepreg P, the supply of the compressed air to the fluid pressure cylinder 28b is stopped, and accordingly, the rod retreats, so that the pressing roller 28a is spaced apart upward from the table 40.

The lay-up head 20 is provided with a recovery unit which takes up and recovers the release paper RP peeled off from the laid-up prepreg P. That is, the lay-up head 20 is provided with the recovery unit which includes a take-up reel 25 for taking up the release paper RP maintained in a continuous long state according to a configuration made such that the cutter unit 30 cuts only the prepreg P, as described above.

The take-up reel 25 of the recovery unit is supported to be relatively non-rotatably fitted to a support shaft 25a rotatably provided to be installed between the pair of support plates 23 and 23 of the support frame.

The recovery unit includes a guide roller 27 for guiding the path of the release paper RP. However, the guide roller 27 is disposed above the laying guide 26a and provided to guide the release paper RP upward from the tip of the laying guide 26a of the laying mechanism 26. The guide roller 27 is disposed such that the path of the release paper RP from the laying guide 26a to the guide roller 27 does not interfere with the pressing mechanism 28 disposed on the downstream side, as described above. The take-up reel 25 (the support shaft 25a) is placed in a position where the release paper RP which is guided by the guide roller 27 disposed in this manner can be taken up.

The recovery unit includes a driving motor 25b for rotationally driving the take-up reel 25, that is, a driving motor 25b connected to the support shaft 25a supporting the take-up reel 25. The supply unit of the prepreg P which includes the raw-cloth roll 21 described above includes a driving motor 21b for rotationally driving the raw-cloth roll 21, that is, a driving motor 21b connected to the support shaft 21a supporting the raw-cloth roll 21.

With respect to the driving motor 21b in the supply unit and the driving motor 25b in the recovery unit, the prepreg P is drawn out from the raw-cloth roll 21 due to the movement of the lay-up head 20 in the laying-up direction in a state where the prepreg P is laid in the lay-up area 40c by the laying guide 26a of the laying mechanism 26 and is pressed on the table 40 by the pressing roller 28a of the pressing mechanism 28. In the drawing-out of the prepreg P from the raw-cloth roll 21 according to such a movement of the lay-up head 20, the driving of the driving motor 21b which is connected to the support shaft 21a supporting the raw-cloth roll 21 and rotationally drives the raw-cloth roll 21 is controlled such that the prepreg P extending from the raw-cloth roll 21 to the lower end of the laying guide 26a enters a state where looseness, twisting, or the like does not occur with a desired tension. The driving of the driving motor 25b which is connected to the support shaft 25a supporting the take-up reel 25 and rotationally drives the take-up reel 25 is controlled such that the release paper RP which is sequentially peeled off from the prepreg P according to the movement of the lay-up head 20 during the lay-up is appropriately taken up by the take-up reel 25 without causing slack or the like.

The trimming mechanism 60 includes a trimming head 70 for cutting the prepreg lay-up material PS made of the prepreg P, a portal type support structural body (corresponding to a second structural body) 80 supporting the trimming head 70, and a pair of side rails 81 and 81 supporting the support structural body 80.

Among them, each of the pair of side rails 81 and 81 is mainly composed of a long rectangular column-shaped base portion 81a. Each side rail 81 includes a pair of support parts 81b and 81b provided to be erected on the floor and to spaced apart from each other and supporting the base portion 81a therebetween. Therefore, each side rail 81 is configured such that the base portion 81a is located further toward the upper side than the side rail 51 of the lay-up mechanism 10 installed on the floor (located at a position close to the top board 40a of the table 40 in the up-down direction). The pair of side rails 81 and 81 is located on both sides of the table 40 in the width direction with their longitudinal direction parallel to the front-rear direction. The pair of side rails 81 and 81 is disposed inside in the width direction with respect to the pair of side rails 51 and 51 of the lay-up mechanism 10.

The support structural body 80 is provided with a pair of columns 83 and 83 provided corresponding to the respective side rails 81, and a crossbeam (corresponding to a second support part) 85 installed between the columns 83 and 83. Each column 83 is composed of a pedestal part 83a and a support post 83b provided to be erected on the pedestal part 83a. Each column 83 is provided in a state of being placed on the base portion 81a of the corresponding side rail 81 at the pedestal part 83a.

The crossbeam 85 is a long rectangular column-shaped beam member and is installed between the pair of columns 83 and 83 in such a manner that each of both end portions thereof is supported on each of the support posts 83b and 83b of both the columns 83 and 83. In a state where the crossbeam 85 is installed in this manner, both the columns 83 and 83 are in a state where the positions in the front-rear direction coincide with each other, and in this way, the crossbeam 85 is in a state where the longitudinal direction thereof coincides with the width direction.

In the support structural body 80, both the columns 83 and 83 have such a height dimension that the height position of the crossbeam 85 installed between the pair of columns 83 and 83, and furthermore, the height position of the trimming head 70 which is placed on the crossbeam 85, as described later, are lower than the crossbeam 55 of the support structural body 50. Therefore, the side rails 81 are disposed as described above with respect to the side rails 51 of the lay-up mechanism 10, whereby the support structural body 80 is located in a space surrounded by the pair of columns 53 and 53 and the crossbeam 55 of the support structural body 50, when viewed in the front-rear direction, and furthermore, the trimming head 70 which is supported on the support structural body 80 is also located in the space.

The trimming head 70 is provided with a cutter blade 71 for cutting the prepreg lay-up material PS, a support shaft 73 supporting the cutter blade 71, and a main body portion 75 having a built-in cutting mechanism (not shown) which supports the support shaft 73 and provides a cutting operation to the support shaft 73 such that a desired cutting by the cutter blade 71 is performed. The trimming head 70 is supported on the crossbeam 85 at the main body portion 75. However, the lay-up head 20 is suspended from the support structural body 50, whereas the trimming head 70 is supported in such a manner that the main body portion 75 is placed on the crossbeam 85.

With respect to each configuration of the trimming head 70, the main body portion 75 is in the form of a box as a whole with a base portion (not shown) as a base body which supports the cutting mechanism in the interior and is supported on the crossbeam 85 by a case body 75a covering the cutting mechanism and the base portion. The main body portion 75 is formed such that the main body portion 75 protrudes to one side in the front-rear direction in a state of being supported on the crossbeam 85 at the base portion and the protruding portion (protrusion portion) extends to the crossbeam 85 side in the up-down direction, and is formed to have an L shape when viewed in the width direction. The cutting mechanism is mounted to the base portion in such a position that it is located mainly in the protrusion portion.

The support shaft 73 is supported by the main body portion 75 (the cutting mechanism) by being mounted to the cutting mechanism installed in the main body portion 75, as described above. The support shaft 73 is mounted to the cutting mechanism in such a direction that the direction of the axis thereof is parallel to the up-down direction. The support shaft 73 has a length dimension protruding from the protrusion portion of the main body portion 75 in a state of being supported as described above, and is provided such that the lower end portion thereof protrudes from the protrusion portion to be located below the protrusion portion.

The support shaft 73 has a cutter holder 73a for mounting the cutter blade 71 to the lower end portion protruding from the main body portion 75 (the protrusion portion), as described above. The cutter blade 71 is mounted to the cutter holder 73a in such a direction that a blade face 71a thereof faces downward.

The cutting mechanism includes a mechanism for applying vibration in the up-down direction to the cutter blade 71 through the support shaft 73 for the cutting of the prepreg lay-up material PS, and a mechanism for rotating the support shaft 73 around the axis thereof to cause the blade face 71a of the cutter blade 71 to direct in an optional direction in order to cut the prepreg lay-up material PS into a desired shape. The main body portion 75 also has a displacement mechanism (not shown) which is provided in the case body 75a and displaces the cutter blade 71 in the up-down direction in order to cause the cutter blade 71 to approach the prepreg lay-up material PS at the time of cutting and separate the cutter blade 71 from the prepreg lay-up material PS at the time of non-cutting, in the up-down direction.

In the trimming mechanism 60, a head moving unit 77 for moving the trimming head 70 in the width direction is provided between the trimming head 70 and the crossbeam 85. The head moving unit 77 is composed of a driving motor 77a mounted to the main body portion 75 of the trimming head 70 with the axis of an output shaft facing in the vertical direction, a rack 77b mounted on the side surface of the crossbeam 85, and a pinion gear 77c mounted to the output shaft of the driving motor 77a and meshes with the rack 77b. Therefore, the trimming mechanism 60 is configured to be driven by the head moving unit 77 such that the trimming head 70 moves in the width direction on the crossbeam 85.

In the trimming mechanism 60, a head moving unit (corresponding to a second driving unit) 78 for moving the trimming head 70 in the front-rear direction is provided between the base portion 81a of each side rail 81 and the column 83 placed on the base portion 81a. Each head moving unit 78 is composed of a driving motor 78a mounted to the column 83 with the axis of an output shaft thereof directed in the vertical direction, a rack 78b mounted on the side surface of the base portion 81a of the side rail 81 so that the rack 78b extends in the front-rear direction, and a pinion gear 78c which is mounted to the output shaft of the driving motor 78a and meshes with the rack 78b. In this way, the trimming mechanism 60 has a configuration in which both the columns 83 and 83 are driven to move in the front-rear direction on the side rails 81 (the base portions 81a). The support structural body 80 as a whole moves in the front-rear direction (along the table 40) as both the columns 83 and 83 are moved in this manner. Therefore, the trimming mechanism 60 is configured such that the trimming head 70 moves in the front-rear direction as the support structural body 80 is moved in the front-rear direction by the head moving unit 78.

As described above, in the manufacturing apparatus 1 of this example, in the lay-up mechanism 10, the lay-up head 20 is supported by the support structural body 50 which is mainly composed of the crossbeam 55 and the pair of columns 53 and 53, and in the trimming mechanism 60, the trimming head 70 is supported by the support structural body 80 which is mainly composed of the crossbeam 85 and the pair of columns 83 and 83. That is, in the manufacturing apparatus 1, the lay-up head 20 and the trimming head 70 are respectively supported by the support structural body 50 and the support structural body 80. Therefore, in the manufacturing apparatus 1, the combination of the support structural body 50 and the support structural body 80 corresponds to a support structure which is referred to in the present invention.

In the manufacturing apparatus 1, the support structural body 50 which is a part of the support structure is supported by the pair of side rails 51 and 51 so that the support structure is movable in the front-rear direction, and the support structural body 80 is supported by the pair of side rails 81 and 81 so that the support structure is movable in the front-rear direction. That is, the support structure is supported by the pair of side rails 51 and 51 and the pair of side rails 81 and 81 so that the support structure is movable in the front-rear direction along the table 40. Therefore, the combination of the pair of side rails 51 and 51 and the pair of side rails 81 and 81 in the manufacturing apparatus 1 corresponds to a guide member which is referred to in the present invention.

In the manufacturing apparatus 1, the movement of the support structural body 50 on the pair of side rails 51 and 51 is performed by the head moving unit 58, and the movement of the support structural body 80 on the pair of side rails 81 and 81 is performed by the head moving unit 78. That is, in the manufacturing apparatus 1, the movement of the support structure on the guide member is performed by the head moving unit 58 and the head moving unit 78. Therefore, the combination of the head moving unit 58 and the head moving unit 78 in the manufacturing apparatus 1 corresponds to a driving mechanism which is referred to in the present invention.

In manufacturing the prepreg lay-up material piece as the fiber-reinforced material piece by the manufacturing apparatus 1 provided with each constituent element described above, first, a lay-up process of laying up the prepreg P in the lay-up area 40c on the table 40 is performed by the lay-up mechanism 10. In the lay-up process by the lay-up mechanism 10, first, the lay-up head 20 is moved toward a lay-up start position in the lay-up area 40c by the operation of the support structural body 50, and the laying guide 26a of the laying mechanism 26 of the lay-up head 20 enters a state of being located above the lay-up start position. In the laying mechanism 26, an operation of lowering the laying guide 26a to the operation position is performed, whereby a state where the prepreg P which is continuous with the raw-cloth roll 21 is pressed against the table 40 side on the table 40 by the laying guide 26a is created.

The lay-up head 20 is moved in the laying-up direction by the support structural body 50, as described above, whereby the prepreg P is laid in the lay-up area 40c on the table 40 while being drawn out from the raw-cloth roll 21. In the process of laying the prepreg P in this manner, the prepreg P which is drawn out from the raw-cloth roll 21 is cut by the cutter unit 30 provided on the upstream side of the laying guide 26a in the path of the prepreg P, at the point in time when the drawing-out length of the prepreg P has reached a predetermined laying length. In this way, the prepreg P which is laid on the table 40 is separated from the prepreg P which is continuous with the raw-cloth roll 21, and becomes the prepreg piece P'. However, the cutting is performed such that the release paper RP bonded to the prepreg P, as described above, is not cut and only the prepreg P is cut.

At the point in time when the cut end of the prepreg piece P' has reached the position of the laying guide 26a according to the movement of the lay-up head 20 for the laying described above, the driving motor 26b is driven in the laying mechanism 26 and the laying guide 26a is displaced toward the non-operation position. In this way, a state where the prepreg piece P' having a predetermined laying length has been laid is create. By repeating the above operation, a state where the prepreg pieces P' are laid (laid up) on the table 40 or on the already laid prepreg piece P' is created. However, although the prepreg piece P' enters a state of being laid in this manner, since the release paper RP has not been cut as described above, the release paper RP from which the prepreg piece P' has been peeled off according to the laying described above is taken up on the take-up reel 25.

The lay-up head 20 is provided with the pressing mechanism 28 provided on the downstream side of the laying mechanism 26, as described above. In the process of laying the prepreg P (the prepreg piece P'), as described above, the pressing mechanism 28 enters a state where compressed air is supplied to the fluid pressure cylinder 28b, so that the pressing roller 28a is biased downward. In this way, the prepreg P (the prepreg piece P') laid on the table 40 or the prepreg piece P', as described above, is pressed toward the table 40 side by the pressing roller 28a and enters a state of being pressed against the table 40 or the prepreg piece P'. In the pressing mechanism 28, at the point in time when the pressing roller 28a has reached the cut end of the prepreg piece P' in the process of each laying, the supply of the compressed air to the fluid pressure cylinder 28b is stopped, and thus a state where the pressing roller 28a is displaced upward is created.

The prepreg P is laid up in the lay-up area 40c on the table 40 by the lay-up process as described above, whereby the prepreg lay-up material PS composed of a plurality of laid-up prepregs P (prepreg pieces P') is formed.

In the manufacturing apparatus 1, a trimming process of cutting out the prepreg lay-up material piece having a predetermined shape from the prepreg lay-up material PS formed in this manner is performed by the trimming mechanism 60.

In the trimming process, first, the trimming head 70 is moved by the operation of the support structural body 80 for the cutter blade 71 to be located above the cutting start position. In the trimming head 70, the displacement mechanism is driven, and thus the cutter blade 71 is lowered to a position where it cuts the prepreg lay-up material PS. In this way, a state where the tip portion of the cutter blade 71 is inserted into the prepreg lay-up material PS is created.

The trimming head 70 moves (the support structural body 80 operates) according to the movement mode set for cutting out the prepreg lay-up material piece having a predetermined shape, whereby the prepreg lay-up material PS is sequentially cut by the cutter blade 71. In the cutting process, vibration in the up-down direction is applied to the cutter blade 71 by the cutting mechanism of the main body portion 75, as described above, and therefore, the cutting is performed smoothly. The movement of the trimming head 70 is performed as a movement in the front-rear direction and/or the width direction by the support structural body 80. However, depending on the shape of the prepreg lay-up material piece to be cut out, an operation of rotating the cutter blade 71 around the axis of the support shaft 73 by the cutting mechanism in the process of the movement is added. Such a series of operations of the trimming head 70 is completed, whereby a state where the prepreg lay-up material piece having a predetermined shape is cut out from the prepreg lay-up material PS is created.

In the manufacturing apparatus 1 described above, in the present invention, the trimming mechanism 60 is configured such that the trimming head 70 can be placed in a position (a retracted position) where the trimming head 70 does not interfere with the lay-up head 20 during the lay-up process, and the lay-up mechanism 10 is configured such that the lay-up head 20 can be placed in a position (a retracted position) where the lay-up head 20 does not interfere with the trimming head 70 during the trimming process. In this example, the retracted position for the trimming head 70 and the retracted position for the lay-up head 20 are set to positions which do not overlap the lay-up area 40c on the table 40 in the front-rear direction. The details of this configuration are as follows. In the following description, regarding the front-rear direction, the side of the lay-up head 20 with respect to the trimming head 70 in the disposition state shown in FIG. 1 is referred to as the "front (front side, front)" and the opposite side is referred to as the "rear (rear side, rear)".

First, with respect to the trimming mechanism 60, the dimension in the front-rear direction of the base portion 81a of each side rail 81 is made larger than the dimension in the longitudinal direction of the top board 40a of the table 40. Each side rail 81 is disposed such that the position of the front end of the base portion 81a (the end on the front side of the base portion 81a) substantially coincides with the position of the front end edge of the table 40 (the end edge on the front side of the top board 40a) in the front-rear direction.

In this way, each side rail 81 is provided in such a manner that the base portion 81a thereof extends further toward the rear side than the rear end edge of the table 40 (the end edge on the rear side of the top board 40a) in the front-rear direction. In the manufacturing apparatus 1, the lay-up area 40c is defined in the top board 40a of the table 40, as described above. Therefore, in the base portion 81a of each side rail 81, the portion (rear end portion) extending further toward the rear side than the rear end edge of the table 40 is naturally located further on the rear side than the lay-up area 40c. The base portion 81a of each side rail 81 is configured such that the rear end portion has such a length dimension that the trimming head 70 and the table 40 do not overlap each other in the front-rear direction in the disposition of the support structural body 80 in which the column 83 is located on the rearmost portion (the rearmost end portion) of each base portion 81a.

With respect to the lay-up mechanism 10, the dimension in the front-rear direction of the base portion 51a of each side rail 51 is made larger than the dimension in the longitudinal direction of the top board 40a of the table 40. Each side rail 51 is disposed such that the position of the rear end of the base portion 51a (the end on the rear side at the base portion 51a) substantially coincides with the position of the rear end edge of the table 40 (the end edge on the rear side of the top board 40a) in the front-rear direction.

In this way, each side rail 51 is provided in such a manner that the base portion 51a thereof extends further toward the front side than the front end edge of the table 40 described above in the front-rear direction. Therefore, in the base portion 51a of each side rail 51, the portion (front end portion) extending further toward the front side than the front end edge of the table 40 is located further on the front side than the lay-up area 40c defined in the top board 40a of the table 40, as described above. The base portion 51a of each side rail 51 is configured such that the front end portion has such a length dimension that the lay-up head 20 and the table 40 do not overlap each other in the front-rear direction in the disposition of the support structural body 50 in which the column 53 is located on the frontmost portion (the frontmost end portion) of each base portion 51*a*.

As described above, in the manufacturing apparatus 1 of this example, each side rail 51 of the lay-up mechanism 10 and each side rail 81 of the trimming mechanism 60 are provided such that the existence ranges thereof overlap with respect to the table 40 in the front-rear direction. That is, the manufacturing apparatus 1 is configured such that the lay-up process by the lay-up mechanism 10 and the trimming process by the trimming mechanism 60 can be performed on the same table 40. In the manufacturing apparatus 1, the support structural body 50 of the lay-up mechanism 10 is configured such that the lay-up head 20 can be placed in the retracted position for the lay-up head 20 described above, and the support structural body 80 of the trimming mechanism 60 is configured such that the trimming head 70 can be placed in the retracted position for the trimming head 70 described above. Therefore, according to the manufacturing apparatus 1, the lay-up process and the trimming process can be performed on the common table 40.

Specifically, in manufacturing the prepreg lay-up material piece in the manufacturing apparatus 1, first, as described above, the lay-up process by the lay-up mechanism 10 is performed. Before the movement of the lay-up head 20 by the support structural body 50 toward the lay-up area 40*c* is performed for the lay-up process, the support structural body 80 of the trimming mechanism 60 enters a state where the column 83 is located on the rearmost end portion of the base portion 81*a* of each side rail 81. In this way, the manufacturing apparatus 1 enters a state where the trimming head 70 is placed in the retracted position for the trimming head 70 described above. As a result, in the manufacturing apparatus 1, the lay-up head 20 on the table 40 (on the lay-up area 40*c*) moves for the lay-up process, which is performed as described above, without interfering with the trimming head 70 of the trimming mechanism 60 provided to perform the trimming process on the same table 40.

In the manufacturing apparatus 1, following the lay-up process, the trimming process for cutting the prepreg lay-up material piece from the prepreg lay-up material PS on the table 40 is performed by the trimming mechanism 60, as described above. Therefore, after the completion of the lay-up process, the movement of the trimming head 70 by the support structural body 80 towards the lay-up area 40*c* is started for the trimming process. Prior to the movement, the support structural body 50 is driven to move the lay-up head 20 located on the table 40 toward the retracted position for the lay-up head 20. In this way, the manufacturing apparatus 1 enters a state where the lay-up head 20 is placed in the retracted position for the lay-up head 20 described above. As a result, in the manufacturing apparatus 1, the trimming head 70 on the table 40 moves for the trimming process, which is performed as described above, without interfering with the lay-up head 20 of the lay-up mechanism 10 provided to perform the lay-up process on the same table 40.

According to the manufacturing apparatus 1 of this example, since the lay-up head 20 for performing the lay-up process and the trimming head 70 for performing the trimming process are provided to be supported together by the support structure, each process can be performed without performing the head exchanging work. The manufacturing apparatus 1 is configured such that the movement of the head in one of the lay-up process and the trimming process is performed without interfering with the head for the other process, as described above, even in the configuration in which the lay-up mechanism 10 which includes the lay-up head 20 and the trimming mechanism 60 which includes the trimming head 70 are disposed to perform the processes thereof on the same table 40. Therefore, according to this configuration, since both the processes can be performed on the common table 40, a conveying process which is required in a case where the lay-up process and the trimming process are performed at different places, as described above, is not required. As a result, the manufacturing apparatus 1 can more efficiently perform the work of manufacturing a fiber-reinforced material piece than in the manufacturing apparatus of the related art as described above.

One embodiment (hereinafter referred to as the "above example") of the apparatus for manufacturing a fiber-reinforced material piece according to the present invention has been described above. However, the present invention is not limited to the configurations described in the above example and can also be implemented as other embodiments (modification examples) as described below.

(1) With respect to the guide member which supports the support structure, in the above example, the manufacturing apparatus 1 is provided with a pair of side rails (hereinafter referred to as the "side rail pair") in two sets (a pair of side rails 51, 51 and a pair of side rails 81, 81) as the guide member, in order to support the first structural body (the support structural body 50) and the second structural body (the support structural body 80) as the support structure. That is, the manufacturing apparatus 1 is configured to support the first structural body with one of the two sets of side rail pairs and support the second structural body with the other.

However, the manufacturing apparatus according to the present invention may be provided with only one pair of side rails even in a case where the support structure is composed of two structural bodies, as in the above example. In this case, the one pair of side rails corresponds to the guide member which is referred in the present invention, and both the structural bodies are supported by the one pair of side rails (one pair of side rails is shared by both the structural bodies).

In the manufacturing apparatus 1 of the above example, as is apparent from the configuration shown in the drawings, due to a configuration in which the lay-up head 20 can interfere with the crossbeam 85 on the trimming mechanism 60 side, the support structural body 50 on the lay-up mechanism 10 side and the support structural body 80 on the trimming mechanism 60 side cannot overlap each other in the front-rear direction. Also in a case where one set of side rail pairs is shared by both the structural bodies, as described above, both the structural bodies cannot overlap each other in the front-rear direction. Therefore, the retracted position for the lay-up head and the retracted position for the trimming head in this case are also set to the same positions as in the above example. In this case, the base portion of each side rail has a front end portion extending further toward the front side than the table 40 and a rear end portion extending further toward the rear side than the table 40 in the front-rear direction, which correspond to the respective retracted positions.

(2) In the manufacturing apparatus 1 of the above example, the two structural bodies cannot overlap each other in the front-rear direction. However, the manufacturing apparatus according to the present invention may include two structural bodies similar to the above example and two pairs of side rails. In this case, both the structural bodies may be disposed to overlap each other in the front-rear direction (such that the positions can be switched in the front-rear direction).

Specifically, in a case where the structural body on the trimming mechanism side is present in a space surrounded by the structural body on the lay-up mechanism side when viewed in the front-rear direction, as in the above example, the structural body on the lay-up mechanism side may be configured such that the lay-up head can be disposed outside the structural body on the trimming mechanism side.

As the configuration of the structural body on the lay-up mechanism side for enabling such disposition of the lay-up head, for example, it is conceivable to form the crossbeam in the structural body to be longer than the crossbeam 55 in the above example and to configure the structural body on the lay-up mechanism side such that a portion (extension portion) extending compared to the crossbeam 55 of the above example is located outside the structural body (a column on one side of a pair of columns) on the trimming mechanism side in the width direction. The length dimension of the extension portion in the crossbeam has such a size that the lay-up head can be disposed within the existence range of the extension portion. In this way, the lay-up head can be disposed outside one column on the trimming mechanism side in the width direction, and due to the disposition, both the structural bodies can be disposed to overlap each other in the front-rear direction.

As a configuration different from it, it is conceivable to form both columns in the structural body to be longer than both the columns 53 and 53 in the above example. The height dimensions (dimensions in the up-down direction) of both columns in this case are such sizes that the lay-up head can be disposed above the structural body (crossbeam) and the trimming head on the trimming mechanism side. In this way, the lay-up head can be disposed above the crossbeam and the trimming head on the trimming mechanism side, and due to the disposition, both the structural bodies can be disposed to overlap each other in the front-rear direction.

(3) With respect to the retracted position for the trimming head and the retracted position for the lay-up head, in the above example, the retracted position for the lay-up head 20 is set to a position further on the front side than the table 40 and the retracted position for the trimming head 70 is set to a position further on the rear side than the table 40. That is, the retracted position for the lay-up head 20 is set to one of the front side and the rear side with respect to the lay-up area 40c in the front-rear direction, and the retracted position for the trimming head 70 is set to the other. However, in the manufacturing apparatus according to the present invention, in a case where both the structural bodies are configured such that the dispositions thereof can overlap each other in the front-rear direction, as described above, both the retracted positions are not limited to the positions which are set as described above.

That is, in this case, the retracted position for the trimming head is set to one of the front side and the rear side with respect to the lay-up area in the front-rear direction, and the retracted position for the lay-up head may be set to any position. Specifically, since both the structural bodies can be disposed to overlap each other in the front-rear direction, the retracted position for the lay-up head is not limited to be set on the side opposite to the retracted position for the trimming head, as in the above example, and may be set on the same side as the retracted position for the trimming head. The retracted position for the lay-up head is not limited to the front side or the rear side of the lay-up area in the front-rear direction in this manner and may be set within the range of the lay-up area when viewed in a plan view.

(4) In the manufacturing apparatus 1 of the above example, the two sets of side rail pairs (the side rail pair 51, 51 and the side rail pair 81, 81) are provided on both sides of the table 40 in the width direction such that the longitudinal direction thereof is parallel to the front-rear direction, that is, such that the longitudinal direction is along the front-rear direction. However, in the manufacturing apparatus according to the present invention, even in a case where the manufacturing apparatus is configured to be provided with two structural bodies and two sets of side rail pairs, as in the above example, the two sets of side rail pairs may not be provided such that both of them are in the front-rear direction.

Figure 5:
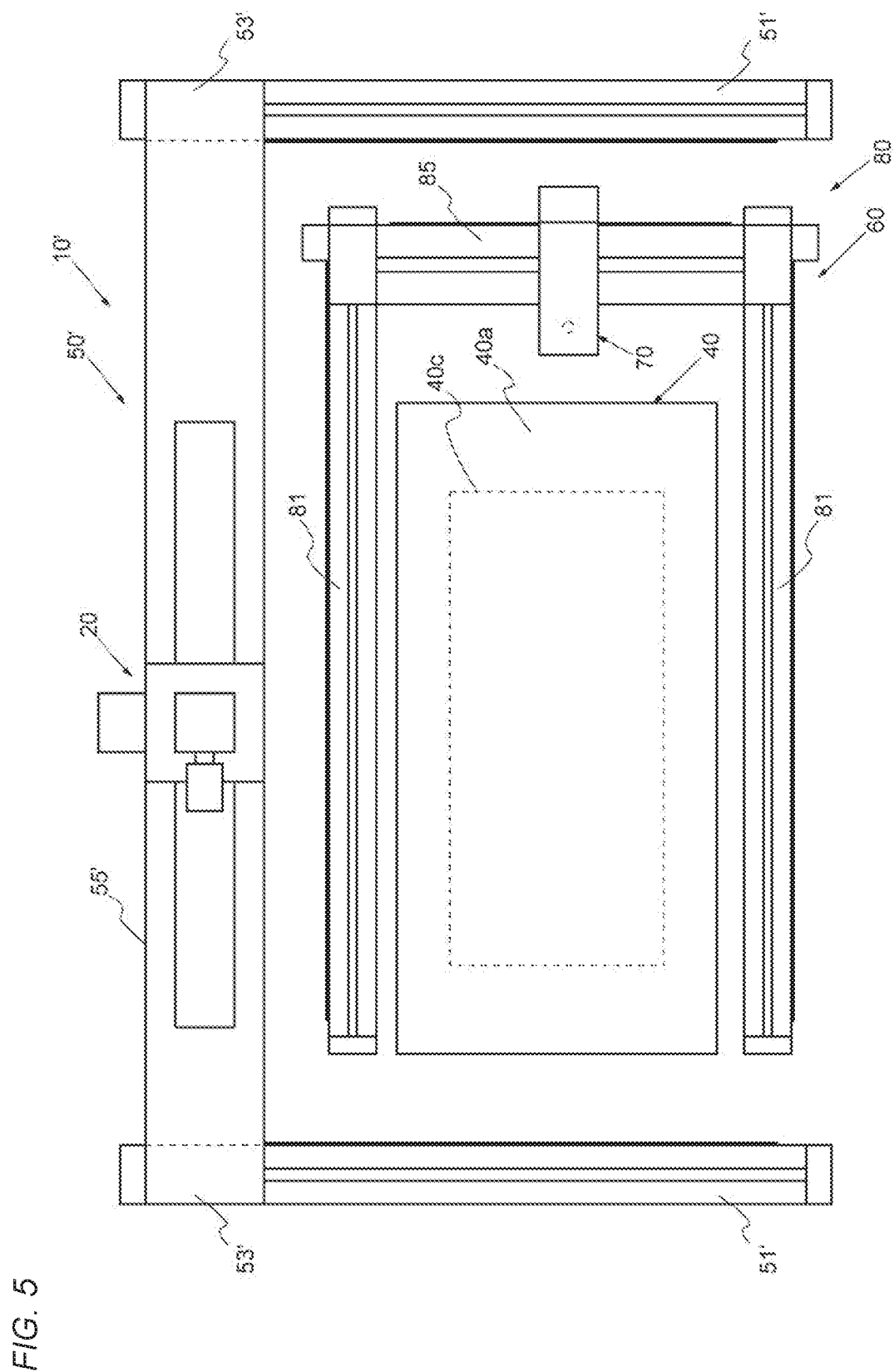
FIG. 5 is an overall plan view of a manufacturing apparatus of another embodiment, to which the present invention is applied.

For example, as shown in FIG. 5, the side rail pair 81, 81 on the trimming mechanism 60 side is provided in the same manner as in the above example, and a pair of side rails 51', 51' on the lay-up mechanism 10' side may be provided in the width direction on both sides of the table 40 in the front-rear direction.

In this case, the pair of side rails 51', 51' on the lay-up mechanism 10' side is disposed on both sides of the pair of side rails 81, 81 in the front-rear direction. The side rail pair 51', 51' has a length dimension larger than the interval in the width direction between the side rail pair 81, 81 on the trimming mechanism 60 side, as shown in the drawing, and the retracted position for the lay-up head 20 can be set outside the side rail 81 on one side.

Therefore, in this case, during the lay-up process, the trimming head 70 is placed at the same retracted position as in the above example, and during the trimming process, the lay-up head 20 is placed at the retracted position set outside the side rail 81 on one side, as described above. However, since a structural body 50' on the lay-up mechanism 10' side strides across the structural body 80 on the trimming mechanism 60 side during the lay-up process, the structural body 50' is configured such that a crossbeam 55' is located above the structural body 80 (the crossbeam 85) and the trimming head 70, similar to the above example.

(5) With respect to the support structure which supports the lay-up head and the trimming head, the manufacturing apparatus 1 of the above example is provided with two structural bodies (the support structural body 50 and the support structural body 80) as the support structure. That is, the manufacturing apparatus 1 is configured to support the lay-up head on one of the two structural bodies and support the trimming head on the other. However, the manufacturing apparatus according to the present invention may be configured such that the lay-up head and the trimming head are supported by a single structural body (a single structural body is shared by both the heads). In this case, the single structural body corresponds to the support structure which is referred to in the present invention.

Specifically, in a case where the single structural body is provided with one crossbeam, similar to the above example, it is favorable if the manufacturing apparatus has a configuration in which both the heads are supported at different positions in the width direction in the one crossbeam. In a case where the manufacturing apparatus is configured in this manner, since both the heads are supported with respect to the common crossbeam, one of both the retracted positions is set on one end side of the crossbeam in the width direction and the other is set on the other end side. Therefore, the length dimension of the crossbeam has such a size that the lay-up head can be disposed outside the lay-up area on the one end side and the trimming head can be disposed outside the lay-up area on the other end side.

In a case where the support structure is configured with a single structural body, as described above, the structural body is not limited to the structure having only one crossbeam described above and may be a structure having two crossbeams corresponding to the respective heads. Specifically, the single structural body may be provided with two crossbeams which are provided between a pair of columns at different positions in the front-rear direction, and the single structural body may be configured to support the lay-up head with one of the two crossbeams and support the trimming head with the other.

In a case where the single structural body includes two crossbeams in this manner, the positional relationship between both the crossbeams in the front-rear direction may be such that both the heads cannot be disposed to overlap each other in the width direction, regarding the relationship of the existence ranges of the lay-up head and the trimming head supported on the respective crossbeams or the portions which support the respective heads with respect to the crossbeams. In this case, both retracted positions may be one end side of one crossbeam and the other end side of the other crossbeam, respectively, similar to a case where a configuration is made such that two heads are supported by one crossbeam described above.

In a case where the positional relationship is such that both the heads can be disposed to overlap each other in the width direction, both the retracted positions may also be on the same side in each crossbeam. In this case, for example, the height position of the crossbeam on the trimming mechanism side may also be set lower (closer to the table) than the height position of the crossbeam on the lay-up mechanism side.

In the manufacturing apparatus according to the present invention, it is preferable that the manufacturing apparatus is provided with two structural bodies and two pairs of side rails, as in the above example, and it is more preferable that the manufacturing apparatus is configured such that both the structural bodies cannot overlap each other in the front-rear direction. Specifically, since the lay-up head is a considerably heavy object, the structural body of the support structure, in particular, the structural body supporting the lay-up head, should have a rigidity for the heavy object. Due to a configuration in which the retracted position is not provided in a space surrounded by the structural body, the structural body on the lay-up mechanism side in the above example can obtain the corresponding rigidity, even if a low-strength structure is used for each part, as compared with a case where the crossbeam or a pair of columns is formed in a long size, as described above. In this way, since the weight of the structural body itself can be suppressed and the cost can be suppressed, the work of manufacturing the fiber-reinforced material piece can be more efficiently performed as described above, and the cost of the manufacturing apparatus itself can also be reduced.

(6) In the above example, each structural body is configured as a portal type structural body in which the crossbeam 55 (the crossbeam 85) which is a support part supporting the head is supported, at both ends, on the pair of columns 53 and 53 (the pair of columns 83 and 83) as support posts. However, in the manufacturing apparatus according to the present invention, the structural body is not limited to a configuration of such a portal type and may be configured as a structural body of a cantilever type in which the support part is supported on a support post only on one end side of the support part. In a case where the structural body is configured as a cantilever type as described above, the support part in the structural body is not limited to a beam member such as the crossbeam of the above example and may be a robot arm configured to have a multi-axial joint.

In a case where the structural body is the cantilever type described above, the structural body can also be configured such that the support part rotates (for example, in the horizontal direction) about the support post. In this case, the movement of the head to the retracted position is not limited to moving the entire structural body as described above or moving the head in the structural body, and the support part may be rotated in the horizontal direction about the support post.

(7) In the above example, the lay-up mechanism 10 is a type in which the raw-cloth roll 21 configured by winding the prepreg P which is a reinforcing fiber base material is supported on the lay-up head 20 and lay-up of the reinforcing fiber base material is performed on the table 40 (the lay-up area 40c) while the raw-cloth roll 21 moves together with the lay-up head 20. However, the lay-up mechanism in the manufacturing apparatus according to the present invention is not limited to the lay-up mechanism of such a type and may be a type in which in addition to the lay-up head, the raw-cloth roll is supported in a supply mechanism fixedly provided adjacent to the lay-up base and lay-up is performed in the lay-up area on the lay-up base by drawing out the reinforcing fiber base material from the raw-cloth roll with the lay-up head. The lay-up mechanism may be a type in which rather than the form of the raw-cloth roll as described above, a reinforcing fiber base material formed into a sheet shape having a predetermined length is prepared in advance in a supply unit provided in the vicinity of the lay-up base and the sheet-shaped reinforcing fiber base material is conveyed to the lay-up area on the lay-up base by the lay-up head to perform lay-up.

(8) In the manufacturing apparatus 1 of the above example, the single table 40 corresponds to the lay-up base which is referred to in the present invention, and one lay-up area 40c is set on the table 40. That is, the manufacturing apparatus 1 is configured such that the lay-up base composed of the single table has one lay-up area. However, the lay-up base in the manufacturing apparatus according to the present invention is not limited to the lay-up base having only one lay-up area, as described above, or a lay-up base composed of a single table. For example, the lay-up base may include a single table on which two lay-up areas can be set. Alternatively, the lay-up base may include a combination of two tables, in each of which one lay-up area is set. In either case, the lay-up base has two lay-up areas.

In a case where the lay-up base has two lay-up areas in this manner and the support structure is composed of two structural bodies, the trimming process is performed in the lay-up area on one side, and at the same time, the lay-up process can be performed in the lay-up area on the other side. In a case where both the structural bodies cannot overlap each other in the front-rear direction, as in the above example, after the lay-up process is performed in the lay-up area on one side, the lay-up process is simultaneously performed in the lay-up area on the other side while the trimming process is performed in the lay-up area on the one side. On the other hand, in a case where both the structural bodies can overlap each other in the front-rear direction, that is, both the structural bodies can be exchanged in the front-rear direction, both the processes can be always performed at the same time. In any case, the working efficiency can be enhanced as compared with a case where the lay-up base has only one lay-up area, and in the latter case, even higher working efficiency can be obtained.

(9) In the above example, the reinforcing fiber base material (the prepreg P) which serves as the base of the fiber-reinforced material (the prepreg lay-up material PS) is a thermosetting prepreg obtained by impregnating carbon fibers as reinforcing fibers with thermosetting resin (epoxy resin or the like) as the matrix resin. However, the reinforcing fiber base material which is used in the manufacturing apparatus according to the present invention is not limited thereto and may be, for example, a prepreg in which glass fibers or aramid fibers are used as reinforcing fibers, or may be a thermoplastic prepreg in which thermoplastic resin is used as the matrix resin. The reinforcing fiber base material is not limited to such a prepreg and may be a so-called semi-preg containing matrix resin, a bonding material (a binder), or the like added for bonding to such an extent that the reinforcing fibers maintain bundling properties.

(10) The embodiments described above are not intended to limit the present invention and may be altered or modified in various ways without departing from the gist of the present invention.

What is claimed is:

1. An apparatus for manufacturing a fiber-reinforced material piece from a fiber-reinforced material formed by laying up reinforcing fiber base materials, the apparatus comprising:
    a lay-up base on which lay-up of reinforcing fiber base materials is performed;
    a lay-up mechanism which has a lay-up head and moves the lay-up head onto a fixed lay-up area on the lay-up base to lay up the reinforcing fiber base materials on the lay-up area;
    a trimming mechanism which has a trimming head and moves the trimming head on the lay-up area to perform trimming on the fiber-reinforced material formed by the lay-up mechanism;
    a support structure which supports the lay-up head and the trimming head;
    a guide member which is provided corresponding to the support structure and supports the support structure so that the support structure is movable along the lay-up base; and
    a driving mechanism which moves the support structure on the guide member, wherein
    the lay-up mechanism is configured to perform a lay-up process for laying up the reinforcing fiber base materials to form the fiber-reinforced material and the trimming mechanism is configured to perform a trimming process for cutting the fiber-reinforced material into a predetermined shape, so that the fiber-reinforced material piece is manufactured through the lay-up process and the trimming process,
    the support structure includes a first structural body supporting the lay-up head, and a second structural body supporting the trimming head,
    the guide member includes a first pair of side rails configured by a pair of side rails supporting the first structural body, and a second pair of side rails configured by a pair of side rails supporting the second structural body,
    the driving mechanism includes a first driving unit which is provided corresponding to the first structural body and is configured to move the first structural body on the first pair of side rails, and a second driving unit which is provided corresponding to the second structural body and is configured to move the second structural body on the second pair of side rails,
    the first structural body includes a pair of first columns supported by the first pair of side rails, and a first support part which is installed between the pair of first columns and supporting the lay-up head,
    the second structural body includes a pair of second columns supported by the second pair of side rails, and a second support part which is installed between the pair of second columns and supporting the trimming head,
    the first structural body and the second structural body are configured to be able to overlap each other in a longitudinal direction of the guide member in a state that the first structural body supports the lay-up head and the second structural body supports the trimming head, and
    in the lay-up process, the support structure allows the trimming head supported on the second structural body to be placed in a trimming head retracted position which does not interfere with the lay-up head, and in the trimming process, the support structure allows the lay-up head supported on the first structural body to be placed in a lay-up head retracted position which does not interfere with the trimming head.

2. The apparatus for manufacturing a fiber-reinforced material piece according to claim 1, wherein
    each of the retracted positions is an out-of-area retracted position which does not overlap the lay-up area in a longitudinal direction of the guide member, and
    the guide member extends to the out-of-area retracted position.

* * * * *